US010427943B2

(12) United States Patent
Takeshita et al.

(10) Patent No.: US 10,427,943 B2
(45) Date of Patent: Oct. 1, 2019

(54) LI-CONTAINING SILICON OXIDE POWDER AND PRODUCTION METHOD THEREOF (71) Applicant: OSAKA Titanium technologies Co., Ltd., Hyogo (JP)

(72) Inventors: Kohki Takeshita, Amagasaki (JP); Shingo Kizaki, Hyogo (JP); Yusuke Kashitani, Hyogo (JP)

(73) Assignee: OSAKA Titanium technologies Co., Ltd., Hyogo (JP)

( * ) Notice: Subject to any disclaimer, the term of this patent is extended or adjusted under 35 U.S.C. 154(b) by 0 days.

(21) Appl. No.: 15/753,038

(22) PCT Filed: Jul. 27, 2016

(86) PCT No.: PCT/JP2016/071981
§ 371 (c)(1),
(2) Date: Feb. 15, 2018

(87) PCT Pub. No.: WO2017/038320
PCT Pub. Date: Mar. 9, 2017

(65) Prior Publication Data
US 2018/0257942 A1    Sep. 13, 2018

(30) Foreign Application Priority Data

Aug. 28, 2015 (JP) ................. 2015-168973

(51) Int. Cl.
*H01B 1/04* (2006.01)
*H01M 4/36* (2006.01)
(Continued)

(52) U.S. Cl.
CPC ............ *C01B 33/113* (2013.01); *C01B 33/20* (2013.01); *H01B 1/04* (2013.01); *H01M 4/36* (2013.01);
(Continued)

(58) Field of Classification Search
CPC .. H01B 1/00; H01B 1/04; H01B 1/08; H01M 4/36; H01M 4/485; H01M 10/052
See application file for complete search history.

(56) References Cited

U.S. PATENT DOCUMENTS 7,589,038 B2 * 9/2009 Goto .................. C03C 10/0027
428/846.9
10,236,531 B2 * 3/2019 Kizaki .................... H01M 4/36
(Continued)

FOREIGN PATENT DOCUMENTS

JP    2997741 B2    1/2000
JP    4702510 B2    6/2011
(Continued)

OTHER PUBLICATIONS

Doh et al "Analysis on the formation of L14SiO4 and Li2SiO3 through first principle calculations . . . ", Journal of Electrochemical Science and Technology VOl 2, No. 3, 2011, 146-151/.*
(Continued)

*Primary Examiner* — Mark Kopec
(74) *Attorney, Agent, or Firm* — Studebaker & Brackett PC (57) ABSTRACT

There is produced a Li-containing silicon oxide powder containing a crystallized lithium silicate that is mostly water-insoluble $Li_2Si_2O_5$ and containing little crystalline Si. This object is attained through the mixing of a lower silicon oxide powder represented by a compositional formula $SiO_x$ ($0.5<x<1.5$) with a powdered lithium source that involves grinding of the powdered lithium source; controlling a median diameter D1 of the lower silicon oxide powder and a median diameter D2 of the powdered lithium source so as to fulfill $0.05 \leq D2/D1 \leq 2$; and calcining the mixed powder at 300° C. or higher and 800° C. or lower.

5 Claims, 4 Drawing Sheets (51) Int. Cl.
*C01B 33/113* (2006.01)
*H01M 4/485* (2010.01)
*C01B 33/20* (2006.01)
*H01M 10/052* (2010.01)
*H01M 4/02* (2006.01)

(52) U.S. Cl.
CPC ......... *H01M 4/485* (2013.01); *C01P 2002/72* (2013.01); *C01P 2002/74* (2013.01); *C01P 2004/61* (2013.01); *C01P 2004/62* (2013.01); *H01M 10/052* (2013.01); *H01M 2004/027* (2013.01)

(56) References Cited

U.S. PATENT DOCUMENTS

| | | | | |
|---|---|---|---|---|
| 2017/0346066 A1* | 11/2017 | Sunano | ............... | H01M 4/38 |
| 2019/0117543 A1* | 4/2019 | Zhao | ............... | A61K 8/20 |
| 2019/0131618 A1* | 5/2019 | Hirose | ............... | H01M 4/5825 |

FOREIGN PATENT DOCUMENTS

| | | |
|---|---|---|
| JP | 2011-222153 A | 11/2011 |
| JP | 4985949 B2 | 7/2012 |
| JP | 2013-114820 A | 6/2013 |
| JP | 2014-071948 A | 4/2014 |
| JP | 2015-153502 A | 8/2015 |
| WO | 2014/188654 A1 | 11/2014 |

OTHER PUBLICATIONS

G. Mondragon-Gutierrez et al.; "Low Temperature Synthesis of Li2SiO3: Effect on Its Morphological and Textural Properties"; Hindawi Publishing Corporation, Research Letters in Materials Science; Dec. 31, 2008; pp. 1-4; vol. 2008; Article ID 908654.

W. Liu et al.; "The effects of Li2CO3 particle size on the properties of lithium titanate as anode material for lithium-ion batteries"; Ionics, May 4, 2014; pp. 1553-1560; vol. 20.

International Search Report; issued in PCT/JP2016/071981; dated Oct. 25, 2016.

* cited by examiner

LI-CONTAINING SILICON OXIDE POWDER AND PRODUCTION METHOD THEREOF

TECHNICAL FIELD

The present invention concerns silicon oxide powders preferably for use in negative electrode materials of lithium ion secondary batteries and production methods thereof, and more specifically Li-containing silicon oxide powders doped with Li and production methods thereof.

BACKGROUND ART

Silicon oxide powders, due to their large electrical capacity, are known to serve as superior negative electrode materials for lithium ion secondary batteries. And yet, the silicon oxide powders serving as the negative electrode materials for lithium ion secondary batteries are low in initial efficiency. A method known to address this problem is lithium doping (Li-doping). Specifically, Li-doping of the silicon oxide powder is intended to improve the initial efficiency by allowing initial charging to be done with the inhibition the formation of lithium compounds that do not contribute to the charging-discharging.

The Li-doping of the silicon oxide powder forms lithium silicate. Lithium silicate has a phase varying depending on an amount of the Li-doping. Specifically, with an increased amount of the Li-doping, lithium silicate has a phase varying from $Li_2Si_2O_5$, through $Li_2SiO_3$, to $Li_4SiO_4$, as shown in chemical formulae below.

$SiO_2 + \tfrac{2}{5}Li \rightarrow \tfrac{1}{5}Li_2Si_2O_5 + \tfrac{3}{5}Si$ $SiO_2 + \tfrac{2}{3}Li \rightarrow \tfrac{1}{3}Li_2SiO_3 + \tfrac{2}{3}Si$ $SiO + Li \rightarrow \tfrac{1}{4}Li_2SiO_4 + \tfrac{3}{4}Si$ [Chem. 1]

Lithium silicate, at its amorphous state, is reactive with water, but through its crystallization, particularly in the case of $Li_2Si_2O_5$, comes to be unreactive with water. This is favorable from viewpoints such as its handlability. It is therefore desirable that Li-containing silicon oxide powder having undergone the Li-doping have lithium silicate mostly in the form of a crystallized $Li_2Si_2O_5$. Meanwhile, $Li_2SiO_3$ and $Li_4SiO_4$ in lithium silicate, even through crystallization, remain reactive with water, which is a reason for such problems as lithium elution during its handling process.

The crystallization process of lithium silicate in the Li-containing silicon oxide powder is accompanied by Si advancing toward crystallization. Crystallization of Si would have an adverse effect on cycle properties of batteries. While the amorphous Si in the absence of heat can retain its amorphous state by, for example, an electrochemical Li-doping, the electrochemical Li-doping however would permit the lithium silicate, too, to be amorphous, and would involve the difficulty in obtaining powders.

It is desirable in view of the above circumstances that Li-containing silicon oxide powders for use in negative electrode materials for lithium ion secondary batteries be the ones that have a crystallized lithium silicate, in particular, crystallized $Li_2Si_2O_5$, and have an amorphous Si.

Such Li-containing silicon oxide powders are produced, for example, by a powder calcining-based method that includes mixing the silicon oxide powder with a powdered lithium source, and calcining the resultant mixture (Patent Literatures 1 to 4). The silicon oxide powders given here are produced by heating a mixture of silicon dioxide and silicon to form a silicon monoxide gas, cooling the resultant silicon monoxide gas for precipitation, and finely grinding the precipitate. The silicon oxide powders produced by such a precipitation method are mostly amorphous enough to have a lowered thermal expansion coefficient, and therefore are said to be advantageous from such viewpoints as accomplishing improved cycle properties.

However, such powder calcining-based Li-doping methods have a problem: lithium silicate formed by such methods includes not just water-insoluble $Li_2Si_2O_5$ but also water-soluble $Li_2SiO_3$ and water-soluble $Li_4SiO_4$. This problem has been addressed by avoiding adding an increased Li-doping amount at the time of Li-doping. Nonetheless, the powders having undergone the Li-doping in a decreased amount represented by, for example, Li/O (atomic ratio)=0.2, which amount is considered from an equilibrium standpoint to contribute to the inhibition of the formation of $Li_2SiO_3$, in fact, exhibit peaks of $Li_2SiO_3$ in the observation by XRD measurement: the presence of this problem has been identified by experiments made by the inventors of the present invention.

Further decreasing the Li-doping amount would limit the formation of lithium silicate itself, depriving the Li-doping of its significance, which would make it impossible to hope for the enhancement of the initial efficiency intended by the Li-doping. Excessively increasing the Li-doping amount, in contrast, (for example, Li/O (atomic ratio)≥1), would cause the lithium silicate phase to be occupied by $Li_4SiO_4$ alone with $Li_2SiO_3$ absent, which is a reason for the exhibition of such an excessive activity as to make its usability inferior.

The inventors have found that the powder calcining-based Li-doping, because of involving heating, could involve disproportionation of silicon oxide that will produce the crystalline Si and that tends to occur at a lower temperature. Another tendency is that an increased doping amount in the Li-doping would lead to an increased amount of metal Si, as is clear from the chemical formulae set forth hereinabove.

In view of the above, the applicant's corporation has performed the powder calcining-based Li-doping at a decreased Li-doping amount and at a lower thermal treatment temperature. And yet, even at a heat treatment temperature at which the disproportionation of silicon oxide should intrinsically not take place (for example, not higher than 700° C.), the resultant powder undergoes the disproportionation of silicon oxide and, in observation by powder XRD measurement, exhibits peaks including a high peak attributed to the crystalline Si, which is a risk for reduced cycle properties.

To the knowledge of the applicant in view of the foregoing, Li-containing silicon oxide powders containing a crystallized lithium silicate that is mostly water-insoluble $Li_2Si_2O_5$ and containing little crystalline Si are nonexistent.

Another approach, aside from the Li-doping, taken to enhance the cycle properties is allowing particles (powder particles) constituting silicon oxide to undergo a carbon coating treatment (C-coating). In Patent Literature 3, Li-doping is followed by C-coating; and in Patent Literature 4, C-coating is followed by Li-doping.

CITATION LIST

Patent Literature

Patent Literature 1: JP-B-2997741
Patent Literature 2: JP-B4702510
Patent Literature 3: JP-B4985949
Patent Literature 4: JP-A-2011-222153

SUMMARY OF THE INVENTION

Technical Problem

An object of the present invention is provided a Li-containing silicon oxide powder containing a crystallized lithium silicate that is mostly water-insoluble $Li_2Si_2O_5$ and containing little crystalline Si; and a production method thereof.

Solution to Problem

To attain the object described above, the present inventors have extensively studied why performing the powder calcining-based Li-doping in a decreased amount considered from an equilibrium standpoint to contribute to the inhibition of the formation of $Li_2SiO_3$ still let the formation of $Li_2SiO_3$. Their studies have revealed facts described below.

The formation of $Li_2SiO_3$ in the Li-doping even in a decreased Li-doping amount considered from an equilibrium standpoint to contribute to the inhibition of the formation of $Li_2SiO_3$, is presumed to mean that the process of calcining the silicon oxide powder and the powdered lithium source involves a non-uniform reaction taking place on particles constituting the silicon oxide powder (powder particles), and that the surface or the inside of the particles locally has the concentration of Li.

Figure 1:
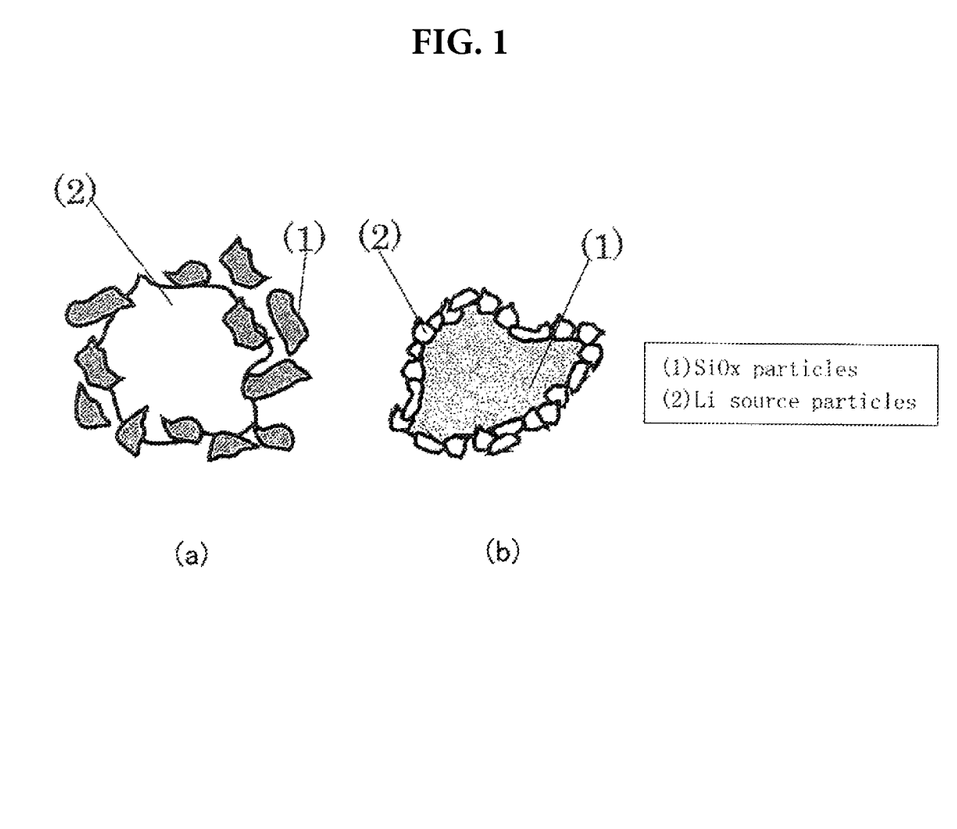
FIG. 1 schematically shows powder particles, shown in (a), produced according to conventional methods, which are compared with powder particles, shown in (b), produced according to the method of the present invention for producing a Li-containing silicon oxide powder.

A possible reason therefor is an excessively large particle diameter of the powdered lithium source as compared with the particle diameter of the silicon oxide powder. For an instance, the particle diameter of the silicon oxide powder in Li-doping, when expressed as a median diameter, ranges from 5 to 10 μm, whereas the particle diameter of the powdered lithium source, when expressed as a median diameter, is about 20 μm. It is believed that performing the Li-doping step using the powdered lithium source having such a larger particle diameter would cause, as shown in FIG. 1(a), particles 1 of the silicon oxide powder to be locally contacted by particles 2 of the powdered lithium source, in which the local reaction occurring at the contacting sites, which is accompanied by the increase in the reaction temperature, results in the concentration of lithium.

In view of the above, mixing the silicon oxide powder and the powdered lithium source and calcining the mixture were preceded by finely-grinding the powdered lithium source. The resultant silicon oxide powder having undergone the Li-doping in this way, when subjected to powder XRD measurement, exhibits peaks including a lowered peak attributed to $Li_2SiO_3$ together with a lowered peak attributed to the crystalline Si. It can be assumed from this result that reducing the particle diameter of the powdered lithium source as compared with the particle diameter of the silicon oxide powder will allow the Li-doping step to be done with the periphery of particles 1 of the silicon oxide powder thinly coated by particles 2 of the powdered lithium source, as illustrated in FIG. 1(b). This will allow the particles 1 of the silicon oxide powder to undergo the reaction in a uniform manner that suppress the local reaction and results in inhibiting the local concentration of lithium.

The Li-containing silicon oxide powder of the present invention, which is founded on such knowledge as described above, is for use in a negative electrode material of a lithium ion secondary battery, with the Li-containing silicon oxide powder undergoing Li-doping, and such a Li-containing silicon oxide powder exhibits peaks observed by X-ray diffractometry using CuKα ray that include a height of peak attributed to $Li_2Si_2O_5$, P1, exhibited at a diffraction angle 2θ ranging from 24.4 to 25.0°; a height of peak attributed to $Li_2SiO_3$, P2, exhibited at a diffraction angle 2θ ranging from 18.6 to 19.2°; and a height of peak attributed to crystalline Si, P3, exhibited at a diffraction angle 2θ ranging from 27.4 to 29.4°, which fulfill Requirement (1): P2/P1<1 and P3/P1<0.5.

The method according to the present invention for producing the Li-containing silicon oxide powder is a method for producing a Li-containing silicon oxide powder for use in a negative electrode material of a lithium ion secondary battery, the method comprising a step of mixing a lower silicon oxide powder represented by a compositional formula SiOx (0.5<x<1.5) with a powdered lithium source, and a step of calcining the mixed powder at 300° C. or higher and 800° C. or lower, wherein a median diameter D1 of the lower silicon oxide powder and a median diameter D2 of the powdered lithium source fulfill Requirement (2): 0.05≤D2/D1≤2.

In the Li-containing silicon oxide powder of the present invention, the height of peak attributed to $Li_2Si_2O_5$, P1, is given by subtracting a background intensity from that peak intensity, in which the peak intensity is a maximum diffraction intensity at a diffraction angle 2θ ranging from 24.4 to 25.0°, and the background intensity is an intensity at 2θ=24.7° on a straight line connecting a diffraction intensity at a diffraction angle 2θ of 24.4° and a diffraction intensity at a diffraction angle 2θ of 25.0°.

Likewise, a height of peak attributed to $Li_2SiO_3$, P2, exhibited at a diffraction angle 2θ ranging from 18.6 to 19.2°, is given by subtracting a background intensity from that peak intensity, in which the peak intensity is a maximum diffraction intensity at a diffraction angle 2θ ranging from 18.6 to 19.2°, and the background intensity is an intensity at 2θ=19.9° on a straight line connecting a diffraction intensity at a diffraction angle 2θ of 18.6° and a diffraction intensity at a diffraction angle 2θ of 19.2°.

Likewise, a height of peak attributed to crystalline Si, P3, exhibited at a diffraction angle 2θ ranging from 27.4 to 29.4°, is given by subtracting a background intensity from that peak intensity, in which the peak intensity is a maximum diffraction intensity at a diffraction angle 2θ ranging from 27.4 to 29.4°, and the background intensity is an intensity at 2θ=28.4° on a straight line connecting a diffraction intensity at a diffraction angle 2θ of 27.4° and a diffraction intensity at a diffraction angle 2θ of 29.4°.

In any cases of the determination of peak intensities, the calculation of the peak intensities can employ data that are obtained by X-ray diffractometry using CuKα ray and prepared at a diffraction angle interval of 0.02° and converted, with the number of data specified of 11, to moving average trendlines. The use of the moving average trendlines reduces measurement errors caused by the fluctuation of diffraction intensities.

The above-identified object is attained by the Li-containing silicon oxide powder of the present invention in which the heights of the peaks, P1, P2 and P3, fulfill Requirement (1): P2/P1<1 and P3/P1<0.5. The ratio P2/P1 of 1 or more, meaning a more amount of $Li_2SiO_3$ produced in the Li-doping, would lead to problems including the elution of lithium resulting in pH increase in a slurrying step, which in turn leads to inferior binder properties and reduced initial efficiency. The P2/P1, which is preferably smaller, is desirably 0.8 or less, and particularly desirably 0.3 or less. The P3/P1 is 0.5 or more, meaning a more amount of the crystalline Si produced in the Li-doping step, would lead to the exhibition of the inferior cycle properties. The P3/P1, which is favorably smaller, is preferably 0.3 or less, and particularly preferably 0.1 or less.

It is preferable that the Li-doping amount (Li content) in the Li-containing silicon oxide powder of the present invention be determined in view of the optimization of an amount of $Li_2Si_2O_5$ in lithium silicate so as to fulfill $0.2 \leq Li/O \leq 0.6$ in terms of element ratio. The ratio Li/O<0.2 would mean insufficiency of lithium silicate itself. The ratio Li/O>0.6, too, would mean insufficiency of $Li_2Si_2O_5$. Namely, the ratio Li/O>0.67 is considered from an equilibrium standpoint not to contribute to the formation of $Li_2Si_2O_5$; and the ratio Li/O≤0.67 but with an increased amount of Li would permit the local reaction to readily proceed, which would be accompanied by a reaction with binders in assembling a battery, the resultant battery failing to have sufficient performance.

In the Li-containing silicon oxide powder of the present invention, particles constituting the powder (i.e., powder particles) preferably have a particle diameter, expressed in terms of a median diameter, ranging from 0.5 to 30 μm. The median diameter, D50, refers to a particle diameter present at cumulative 50% from the finer-particle side (or more-coarse particle side) in the volume-based cumulative particle-size distribution, and can be measured by using a laser diffraction-type particle size distribution measuring equipment. By having the median diameter ranging from 0.5 to 30 μm, the powder attains good dispersibility, and in its use in the form of a slurry in a negative electrode of a lithium ion secondary battery, allows the slurry to have a viscosity suitable for its application. Another benefit accomplished in the use in the negative electrode of the lithium ion secondary battery is successful suppression of an electrolyte solution from reacting with surfaces of the particles constituting the negative electrode thereby inhibiting the battery life from shortening. The median diameter especially desirable ranges 0.5 to 15 μm.

In another preferable embodiment of the Li-containing silicon oxide powder of the present invention, at least part of the particles constituting the powder (i.e., powder particles) has a conductive carbon film. The formation of the conductive carbon film improves the electrical conductivity among powder particles constituting the negative electrode, and the electrical conductivity between the negative electrode and its base, i.e., a collector, resulting in the provision of the lithium secondary battery with improved cycle properties. The formation of the conductive carbon film herein will be referred to as C-coating.

The amount of the conductive carbon film possessed by the particles constituting the Li-containing silicon oxide powder (i.e., powder particles), when expressed in terms of a weight proportion of carbon with respect to a mass of the whole of the silicon oxide powder, preferably ranges from 0.5 to 20 wt %. The formation of the film in an amount less than 0.5 wt % would weaken the significance of the formation of the conductive carbon film with respect to the powder particles. On the other hand, the formation of the film in an amount more than 20 wt %, meaning a lowered ratio of the silicon oxide powder relative to the whole of the active material, would weaken the capacity increase benefits intended by the use of the silicon oxide powder. The amount of the film formed is especially preferably from 0.5 to 7 wt %, and more preferably from 0.5 to 5 wt %.

In the method according to the present invention for producing the Li-containing silicon oxide powder, the silicon oxide powder to be subjected to the mixing step (i.e., silicon oxide powder raw material) is a lower silicon oxide powder represented by a compositional formula $SiO_x$ (0.5<x<1.5) for reasons that the ratio x≤0.5 would cause the lithium ion secondary battery to have inferior cycle properties and the ratio x≥1.5 would give rise to the reduction in the initial efficiency and in the capacity. The compositional formula desirable in particular is 0.7≤x≤1.3.

Examples of the powdered lithium source to be mixed with the silicon oxide powder in the mixing step include lithium hydride, lithium oxide, lithium hydroxide and lithium carbonate. Desirable in particular among those is lithium hydride, the use of which is accompanied by little amount of by-products and infrequent reduction of battery capacity.

The mixing ratio between the silicon oxide powder and the powdered lithium source that is preferable considering, in the calcining step following the mixing step, the promotion of the formation of water-insoluble $Li_2Si_2O_5$, the inhibition of the formation of water-soluble $Li_2SiO_3$, and the inhibition of the formation of the crystalline Si, when expressed in terms of an element ratio, more accurately, an element ratio between 0 in the lower silicon oxide powder and Li in the powdered lithium source, is $0.2 \leq Li/O \leq 0.6$. The ratio Li/O>0.67 is considered from an equilibrium standpoint not to contribute to the formation of $Li_2Si_2O_5$. The ratio Li/O≤0.67 but with an increased amount of Li would permit the local reaction to readily proceed, which would be accompanied by a reaction with binders in assembling a battery, the resultant battery failing to have sufficient performance.

From an equilibrium standpoint, with Li/O being less than 0.4, $Li_2Si_2O_5$ alone is formed; with Li/O reaching 0.4, $Li_2SiO_3$ begins to be formed; and with Li/O reaching 0.67, $Li_2Si_2O_5$ stops being formed and instead $Li_4SiO_4$ begins to be formed (see the chemical formula 1).

Of particular significance in the method according to the present invention for producing the Li-containing silicon oxide powder is controlling the ratio between the median diameter D1 of the lower silicon oxide powder serving as the silicon oxide powder raw material and the median diameter D2 of the powdered lithium source to be mixed therewith (median diameter ratio D2/D1) to fall within the range from 0.05 to 2. This is in view of frequent cases where the median diameter of the silicon oxide powder for use in a negative electrode material of a lithium ion secondary battery ranges from 0.5 μm to 30 μm: at D2/D1<0.05, the powdered lithium source excessively small would change itself to secondary particles, failing to give the benefits of the uniform mixing, and at D2/D1>2, the powdered lithium source excessively larger than the silicon oxide powder would permit the local concentration of lithium to readily occur at the time of the reaction. The ratio D2/D1 preferable considering the inhibition of the concentration of lithium at the time of the reaction is from 0.05 to 1, and particularly preferably from 0.05 to 0.5. As described above, the inhibition of the concentration of lithium at the time of the reaction of the silicon oxide powder leads to the inhibition of the formation of $Li_2SiO_3$ together with the inhibition of the formation of the crystalline Si.

The median diameter ratio D2/D1 ranging from 0.05 to 2 that is given by the silicon oxide powder raw material and the powdered lithium source to be mixed therewith is controlled by grinding the powdered lithium source before its mixing with the silicon oxide powder or after its mixing with the silicon oxide powder. The grinding may be done, for example, by manually grinding the powdered lithium source with a mortar followed by subjecting the powder thus ground to a sieve with a small opening, or a method using a ball mill or a bead mill. The use of a grinding medium having a Mohs' hardness that is lower than the silicon oxide powder and higher than the powdered lithium source improves productivity, since using such a medium for mixing the silicon oxide powder with the powdered lithium source that is followed by grinding the mixture would enable a selective grinding of the powdered lithium source simultaneously with the mixing.

The calcining temperature in the calcining step is controlled to range from 300° C. to 800° C.: the calcining at an excessively higher temperature would invite the disproportionation of silicon oxide thereby causing the precipitation of the crystalline Si and leading to the exhibition of inferior cycle properties; and the calcining at an excessively lower temperature would make it difficult for the Li-doping reaction to proceed thereby leading to such disadvantages as insufficiency of lithium silicate and excessively prolonged reaction time. The calcining temperature preferably ranges from 300° C. to 700° C. The calcining temperature is particularly preferably from 400° C. to 700° C., and more preferably from 500° C. to 650° C. The calcining atmosphere is preferably an inert gas atmosphere, in particular, an argon gas atmosphere.

In the method according to the present invention for producing the Li-containing silicon oxide powder, the silicon oxide powder to be subjected to the mixing step preferably undergoes a carbon coating treatment (C-coating) to have a conductive carbon film. The C-coating may be a known thermal treatment, for example, a thermal CVD method using a hydrocarbon gas.

Such a thermal treatment, which provides at least part of the particles constituting the silicon oxide powder (i.e., powder particles) with the conductive carbon film, improves the electrical conductivity among powder particles constituting the negative electrode, and the electrical conductivity between the negative electrode and its base, i.e., a collector, resulting in the provision of the lithium secondary battery with improved cycle properties.

In particular, allowing the silicon oxide powder which will be later subjected to the mixing step to undergo the C-coating (i.e., allowing the silicon oxide powder to undergo the C-coating prior to the Li-doping) would lead to avoiding adverse effects caused by the decrease of the temperature involving the disproportionation in the Li-doping. Specifically, considering frequent cases where the C-coating temperature is higher than the Li-doping temperature as well as the tendency of the temperature involving the disproportionation being decreased by the Li-doping, great concern would arise, in the case of performing the Li-doping followed by the C-coating, that the C-coating will advance the possible disproportionation. This concern is eliminated in the case of performing the C-coating followed by the Li-doping, and in this way the formation of the crystalline Si caused by the possible disproportionation is inhibited.

In addition, performing the C-coating followed by the Li-doping allows the carbon film of the particles constituting the silicon oxide powder to be interposed between those particles and the particles constituting the particulate lithium source, and thereby allowing the film to serve as a buffer layer (buffer). The C-coating, too, is therefore expected to inhibit the local concentration of lithium, which in turn inhibits the formation of $Li_2SiO_3$ and the crystalline Si.

The method for producing the Li-containing silicon oxide powder of the present invention is not limited to the above-described powder calcining method that includes mixing the above-described silicon oxide powder with the powdered lithium source and calcining the mixture, and is therefore applicable to other thermal Li-doping methods involving heating as well as to other methods than the thermal Li-doping methods: specifically an electrochemically Li-doping followed by performing a thermal treatment at an appropriate temperature.

Advantageous Effects of the Invention

The Li-containing silicon oxide powder of the present invention contains a crystallized lithium silicate that is mostly water-insoluble $Li_2Si_2O_5$ and contains little water-soluble $Li_2SiO_3$. This configuration inhibits the elution of lithium leading to pH increase in a process to provide thin film electrodes, which in turn suppresses inferior binder properties and reduced initial efficiency. The inclusion of little amount of the crystalline Si contributes to inhibiting the cycle properties from being lowered by the crystalline Si.

The method according to the present invention for producing the Li-containing silicon oxide powder, which is capable of producing a Li-containing silicon oxide powder containing a crystallized lithium silicate that is mostly water-insoluble $Li_2Si_2O_5$ and containing little water-soluble $Li_2SiO_3$, is effective in preventing the elution of lithium inviting an increased pH increase in a slurrying step, which in turn suppresses inferior binder properties and reduced initial efficiency. Also, the method according to the present invention, which enables the silicon oxide powder to be produced with the inhibition of the formation of the crystalline Si, is effective in preventing the reduction of the cycle properties caused by the formation of the crystalline Si.

DESCRIPTION OF EMBODIMENTS

Embodiments of the present invention will be described hereinafter. The method according to embodiments of the present invention for producing a Li-containing silicon oxide powder begins with the preparation of a silicon oxide powder serving as a raw material used in the production method, and of a powdered lithium source to be mixed therewith.

The silicon oxide powder serving as a raw material is a lower silicon oxide powder represented by a compositional formula SiO ($0.5<x<1.5$). Used here is an amorphous SiO produced by precipitation method, i.e., the one represented by SiO ($x=1$). The silicon oxide powder has a particle diameter, in terms of median diameter, of 0.5 to 30 μm.

Examples of the powdered lithium source include lithium hydride (LiH), lithium oxide ($Li_2O$), lithium hydroxide (LiOH) and lithium carbonate ($Li_2CO_3$). Used here is lithium hydride (LiH).

The silicon oxide powder serving as the raw material is subjected to C-coating that gives a carbon film. The C-coating is performed by a thermal CVD method using a hydrocarbon gas, for example, under an atmosphere of a mixed gas of propane and argon, at 850° C. The C-coating amount when expressed in terms of a weight proportion of carbon with respect to a mass of the whole of the silicon oxide powder is 0.5 to 20 wt %.

The powdered lithium source is subjected to grinding treatment. The grinding treatment is done, for example by the use of a mortar, so as to give a controlled particle size after grinding such that the powdered lithium source and the silicon oxide powder provide the median diameter ratio (D2/D1) ranging from 0.05 to 2, preferably from 0.05 to 1.

Subsequently, the C-coated silicon oxide powder is mixed with the grinding-treated powdered lithium source. The mixing ratio is controlled to give a Li/O molar ratio ranging from 0.2 to 0.6 considering, from an equilibrium standpoint, the promotion of the formation of $Li_2Si_2O_5$ together with the inhibition of the formation of $Li_2SiO_3$.

Subsequently, the mixed powder of the silicon oxide powder and the powdered lithium source is subjected to its calcining under an inert gas atmosphere. The calcining temperature ranges from 300 to 800° C., and more specifically such a temperature region as to avoid involving the disproportionation of the silicon oxide powder. The calcining allows the silicon oxide powder to undergo the Li-doping, and consequently gives the Li-containing silicon oxide powder.

Here, the mixing ratio of the powdered lithium source to the silicon oxide powder restricted to be in the lower range considered from an equilibrium standpoint to contribute to the inhibition of the formation of $Li_2SiO_3$, and the powdered lithium source finely ground so that both the powders give the median diameter ratio (D2/D1) ranging from 0.05 to 2, particularly from 0.05 to 1, lead to the inhibition of the local reaction on the particles constituting the silicon oxide powder thereby inhibiting the concentration of lithium, with a result that the lithium silicate phase of the Li-containing silicon oxide is mostly composed of $Li_2Si_2O_5$, and concurrently the formation of the crystalline Si in the Li-containing silicon oxide is inhibited.

Specifically, the produced Li-containing silicon oxide powder, when observed by X-ray diffractometry using CuKα ray, exhibits peaks that include a height of peak attributed to $Li_2Si_2O_5$, P1, exhibited at a diffraction angle 2θ ranging from 24.4 to 25.0°; a height of peak attributed to $Li_2SiO_3$, P2, exhibited at a diffraction angle 2θ ranging from 18.6 to 19.2°; and a height of peak attributed to crystalline Si, P3, exhibited at a diffraction angle 2θ ranging from 27.4 to 29.4°, fulfill P2/P1<1 and P3/P1<0.5.

The produced Li-containing silicon oxide powder is used as a negative electrode material of a lithium ion secondary battery. Specifically, the Li-containing silicon oxide powder is mixed with an aqueous binder to give a slurry, and the slurry is applied on a collector composed of e.g., a copper foil, followed by drying, to provide a thin film working electrode. The lithium silicate phase in the Li-containing silicon oxide powder is mostly composed of water-insoluble $Li_2Si_2O_5$ and hardly contains water-soluble $Li_2SiO_3$. This configuration prevents the elution of lithium from the silicon oxide, and improves the initial efficiency included in battery performances as intended. Also, the configuration inhibits the silicon oxide from having the crystalline Si, and accordingly inhibits the reduction of the cycle properties included in battery performances. Improvement benefits attained by the inhibition of the formation of $Li_2SiO_3$, which is Li-rich, are seen not just in the use of an aqueous binder but also in the use of a solvent-based binder composed of an organic solvent as a solvent, since most of such polymer components as polyimides is reactive with lithium.

EXAMPLES

Example 1

A silicon oxide powder serving as a raw material prepared for producing a Li-containing silicon oxide powder was an amorphous SiO powder produced by precipitation method. The SiO powder raw material had a median diameter of 8.0 μm. For the SiO powder raw material to undergo the C-coating through a thermal treatment, the SiO powder was thermally-treated at 850° C. for 30 minutes in a furnace into which a carbonizing gas was supplied at a flow rate of 1 liter per minute, the carbonizing gas being given by mixing argon and propane at a weight ratio of 1:1.

Subjecting the C-coated SiO powder to combustion-infrared absorption method revealed that the particles constituting the Si powder had a conductive carbon film formed at a weight ratio of 1.00%. The C-coated SiO powder had a median diameter D1 of 8.2 μm.

A powdered lithium source selected for mixing with the raw material SiO was LiH powder, which originally had a median diameter of 20.8 μm, considerably larger than the median diameter of the C-coated SiO powder. The LiH powder was thus finely ground with a mortar in a glove box under an argon atmosphere, and the ground powder was classified by using a test sieve with an opening of 16 μm.

The finely-ground LiH powder was subjected to a dry-particle size distribution measurement using a laser diffraction-type particle size distribution measuring equipment, HELOS, manufactured by Sympatec GmbH. The finely-ground LiH powder was found to have a median diameter D2 of 5.1 μm, which was smaller than the median diameter D1 of the C-coated SiO powder (8.2 μm), which gave a median diameter ratio D2/D1 of 0.62.

For Li-doping treatment, the C-coated SiO powder (median diameter 8.2 μm) was mixed with the finely-ground LiH powder so as to give a Li/O molar ratio of 0.5, and thereafter the mixture was calcined in an argon atmosphere in a furnace (1 atm, 600° C.) for 72 hours.

In the X-ray diffractometry using CuKα ray of the produced Li-containing SiO powder, a height of peak attributed to $Li_2Si_2O_5$, P1, exhibited at a diffraction angle 2θ ranging from 24.4 to 25.0°; a height of peak attributed to $Li_2SiO_3$, P2, exhibited at a diffraction angle 2θ ranging from 18.6 to 19.2°; and a height of peak attributed to crystalline Si, P3, exhibited at a diffraction angle 2θ ranging from 27.4 to 29.4° were examined to calculate P2/P1 and P3/P1.

The SiO powder undergoing the C-coating and the Li-doping was used to fabricate a negative electrode of a lithium ion secondary battery. Specifically, the SiO powder, ketjen black, and a polyimide precursor serving as a non-aqueous solvent-based binder were mixed together at a mass ratio of 85:5:10. To the mixture, NMP (n-methylpyrrolidone) was added, followed by kneading, to give a slurry. The slurry was applied on a copper foil with a thickness of 40 μm, and pre-dried at 80° C. for 15 minutes. This was followed by punching so as to give a diameter of 11 mm, and further by an imidizing treatment. In this way, a negative electrode was provided.

The fabricated negative electrode was used to produce a lithium ion secondary battery. A counter electrode used was a lithium foil. An electrolyte used was a solution prepared by dissolving $LiPF_6$ (lithium hexafluorophosphate) at 1 mol/L in a solution that had been given by mixing ethylene carbonate with diethyl carbonate at a volume ratio of 1:1. A separator used was a polyethylene porous film with a thickness of 30 μm. In this way, a coin cell was fabricated.

The fabricated lithium ion secondary battery was subjected to charging-discharging tests with the use of a secondary battery charging-discharging tester (manufactured by NAGANO Co., Ltd.). Conditions for the charging-discharging operations are shown in Table 1. Through the charging-discharging tests, initial charging capacity, initial discharging capacity, ratio of the initial discharging capacity to the initial charging capacity (hereinafter referred to as "initial efficiency"), and ratio of discharging capacity given at 50th cycles relative to the initial discharging capacity (hereinafter referred to as the "discharging capacity retentivity after 50 cycles") were determined.

TABLE 1

|  | Charging | | Discharging | |
|---|---|---|---|---|
| 1st | CC-CV 0.1 C | 5 mV-0.01 C | CC 0.1 C | 1.5 V |
| 2nd | CC-CV 0.3 C | 5 mV-0.01 C | CC 0.3 C | 1.5 V |
| 3rd~50th | CC-CV 0.5 C | 5 mV-0.01 C | CC 0.5 C | 1.5 V |

Example 2

The same operation as in Example 1 was performed, except that in Example 1, the SiO powder raw material was changed to the one with a median diameter of 5.6 μm, which was smaller than in Example 1, and together with this change, the thermal treatment time for the C-coating was shortened from 30 minutes to 27 minutes. The C-coating amount in the C-coated SiO powder was 0.94 wt %. The median diameter D1 was 5.8 μm, and the median diameter ratio D2/D1 was 0.88.

Example 3

The same operation as in Example 1 was performed, except that in Example 1, the Li-doping was performed so that the mixing ratio between the C-coated SiO powder and the finely-ground LiH powder (Li/O molar ratio) was 0.2.

Example 4

The same operation as in Example 2 was performed, except that in Example 2, the Li-doping was performed so that the mixing ratio between the C-coated SiO powder and the finely-ground LiH powder (Li/O molar ratio) was 0.2.

Comparative Example 1

The same operation as in Example 2 was performed, except that in Example 2, the Li-doping of the SiO powder that had been C-coated (median diameter 8.2 μm) involved the use of a LiH powder that did not undergo the fine grinding and had a median diameter of 20.8 μm. The median diameter ratio D2/D1 was 2.54.

Comparative Example 2

The same operation as in Example 4 was performed, except that in Example 4, the Li-doping of the SiO powder that had been C-coated (median diameter 8.2 μm) involved the use of a LiH powder that did not undergo the fine grinding and had a median diameter of 20.8 μm.

Results of X-ray diffractometry of Li-containing SiO powders produced in Examples 1 to 4 and Comparative Examples 1 and 2 (P2/P1 and P3/P1), and results of charging-discharging tests (initial charging capacity, initial discharging capacity, initial efficiency, and discharging capacity retentivity after 50 cycles), together with mixing ratios between SiO powder and LiH powder (Li/O molar ratio) in Li-doping and median diameter ratios D2/D1, are shown in Table 2.

Figure 2:
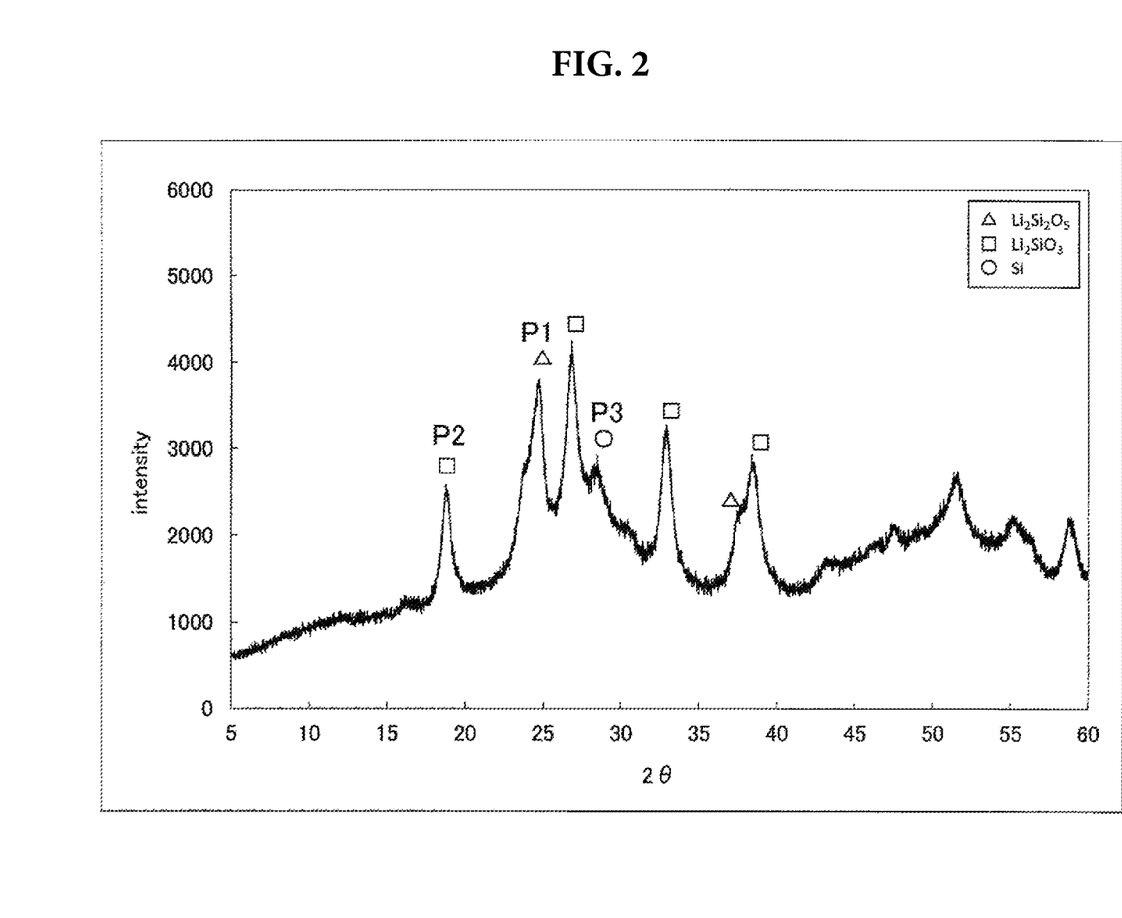
FIG. 2 shows an X-ray diffraction chart of a Li-containing silicon oxide powder produced according to the present invention.
Figure 3:
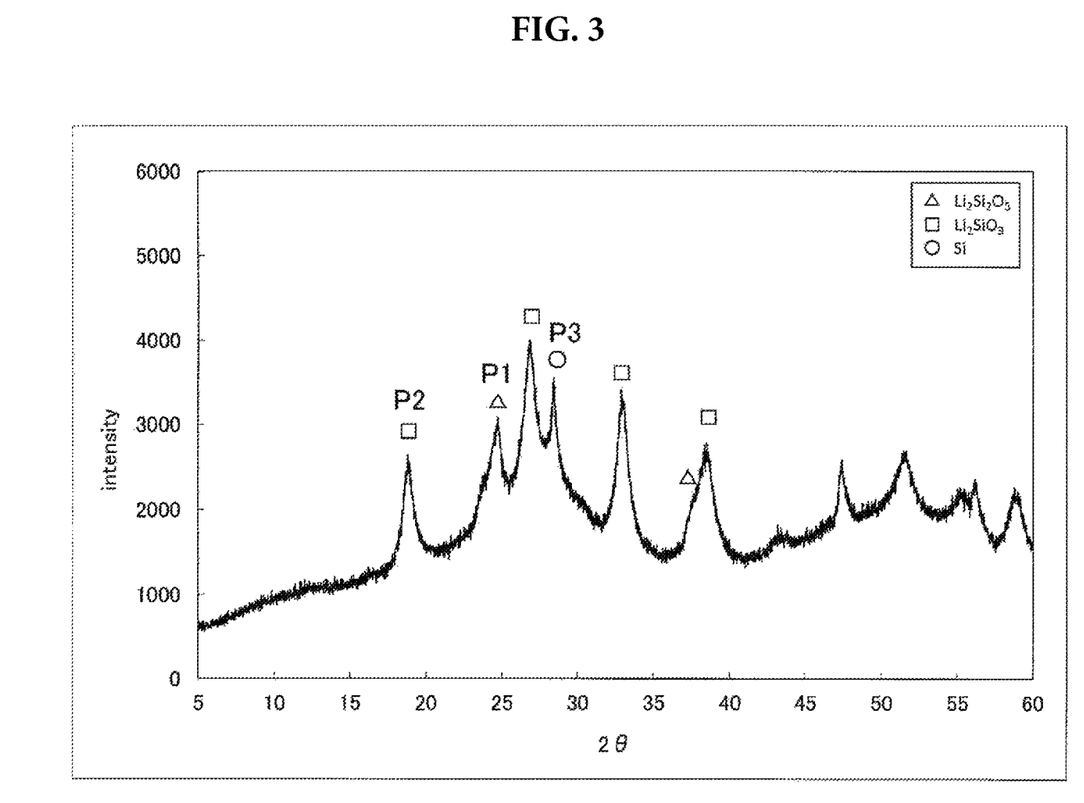
FIG. 3 shows an X-ray diffraction chart of a conventional Li-containing silicon oxide powder.

An X-ray diffraction chart of the Li-containing SiO powder produced in Example 2 is shown in FIG. 2, and an X-ray diffraction chart of the Li-containing SiO powder produced in Comparative Example 1 is shown in FIG. 3. An X-ray diffraction chart of a SiO powder not doped with Li is shown in FIG. 4 for reference purpose.

TABLE 2

|  | Li/O | D2/D1 | P2/P1 | P3/P1 | Initial charging capacity | Initial discharging capacity | Initial efficiency | Discharging capacity retentivity after 50 cycles |
|---|---|---|---|---|---|---|---|---|
| Example 1 | 0.5 | 0.62 | 0.21 | 0.07 | 1853 | 1568 | 84.6 | 86.5 |
| Example 2 | 0.5 | 0.88 | 0.71 | 0.20 | 1802 | 1515 | 84.1 | 87.2 |
| Example 3 | 0.2 | 0.62 | 0.05 | 0.05 | 2050 | 1615 | 78.8 | 87.3 |
| Example 4 | 0.2 | 0.88 | 0.11 | 0.10 | 2203 | 1679 | 76.2 | 88.5 |
| Comparative Example 1 | 0.5 | 2.54 | 1.27 | 0.79 | 1900 | 1225 | 64.5 | 2.1 |
| Comparative Example 2 | 0.2 | 2.54 | 1.12 | 1.78 | 2281 | 1710 | 75.0 | 53.1 |

Figure 4:
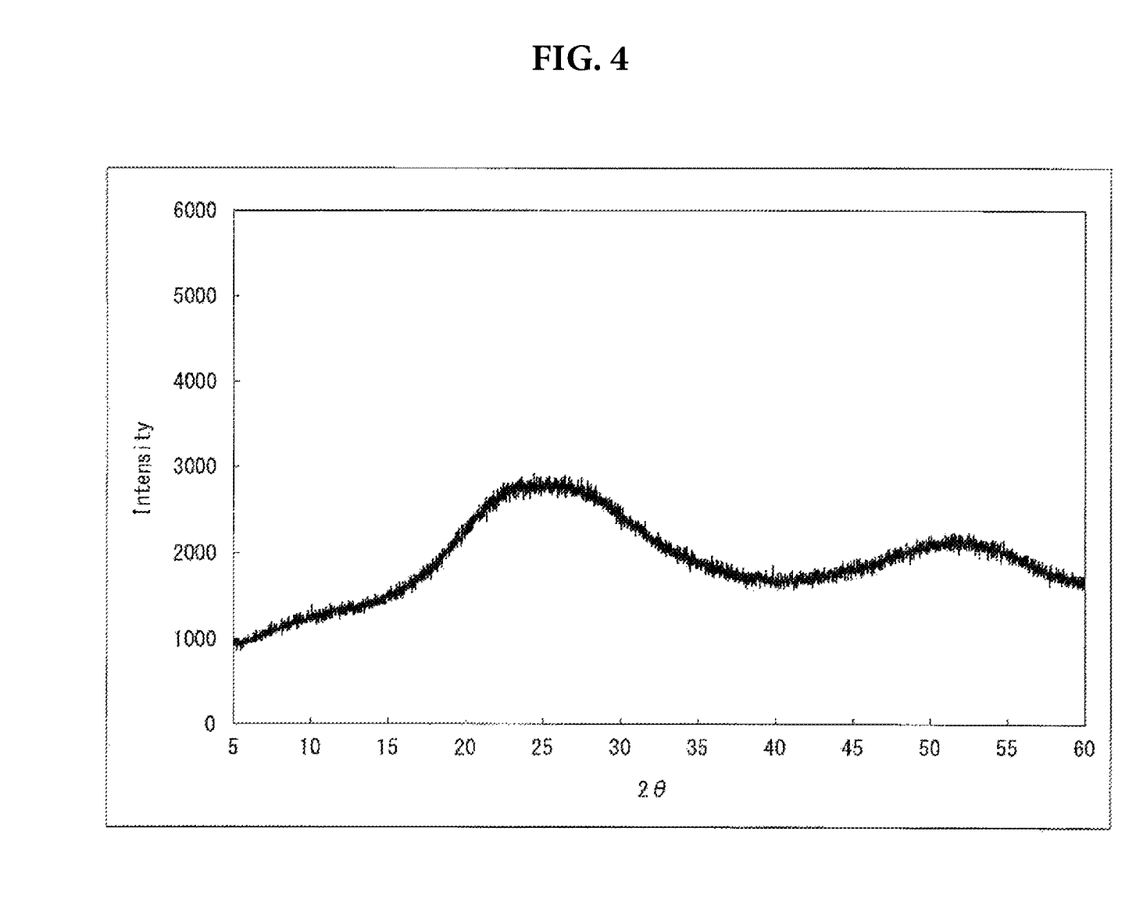
FIG. 4 shows an X-ray diffraction chart of silicon oxide powder not doped with Li.

SiO powder not doped with Li does not exhibit any crystalline peaks, as is evident from FIG. 4, and is therefore practically amorphous. The X-ray diffraction chart shown in FIG. 4 is of the SiO powder not doped with Li and not C-coated, which SiO powder was found to be the one that even after undergoing the C-coating at C-coating temperature of 850° C. did not exhibit any crystalline peaks. Allowing this SiO powder to undergo the C-coating and thereafter Li-doping produced powders, in Comparative Examples 1 to 2, that in spite of having undergone the Li-doping at a low temperature of 600° C. markedly exhibited not just peaks attributed to $Li_2Si_2O_5$ but also peaks attributed to $Li_2SiO_3$ and the crystalline Si, as is evident from FIG. 3.

The above result is contrasted with Examples 1 to 4, where allowing SiO powder to undergo the C-coating and thereafter the Li-doping produced powders that exhibited high peaks attributed to $Li_2Si_2O_5$ but with low peaks attributed to $Li_2SiO_3$ and to the crystalline Si, as is evident from FIG. 2. This is due to the fact that the Li-doping was preceded by finely grinding the LiH powder serving as a raw material of the Li-doping to give a median diameter ratio D2/D1 that had been kept lower as compared with the SiO powder, which accordingly inhibited the local reaction from occurring on the SiO powder particles and suppressed the concentration of lithium, resulting in the inhibition of the formation of $Li_2SiO_3$ and the formation of the crystalline Si.

In fact, as is evident from Table 2, Examples 1 to 4, as compared with Comparatives Examples 1 and 2, the ratio P2/P1 of a height of peak attributed to $Li_2SiO_3$, P2, relative to a height of peak attributed to $Li_2Si_2O_5$, P1, is kept to be not higher than 1; and moreover the ratio P3/P1 of a height of peak attributed to crystalline Si, P3, relative to a height of peak attributed to $Li_2Si_2O_5$, P1, is kept to as low as 0. This resulted in superior battery performances: high initial efficiency values and high discharging capacity retentivity values after 50 cycles.

The comparison between Examples 1 versus Example 3 and the comparison between Example 2 versus Example 4 each show that the former example attained a larger P2/P1 than the latter example, i.e., the former examples having a higher initial efficiency: this is due to a more amount of Li-doping amount (Li/O) in the Li-doping. The comparison between Example 1 versus Example 2 and the comparison between Example 3 versus Example 4 each show that the latter example attained a lager P2/P1 than the former example: this will be due to a larger median diameter ratio D2/D1 of the LiH powder to the SiO powder.

The invention claimed is:

1. A Li-containing silicon oxide powder for use in a negative electrode material of a lithium ion secondary battery, with the Li-containing silicon oxide powder undergoing Li-doping, the Li-containing silicon oxide powder exhibiting peaks observed by X-ray diffractometry using CuKα ray that include a height of peak attributed to $Li_2Si_2O_5$, P1, exhibited at a diffraction angle 2θ ranging from 24.4 to 25.0°; a height of peak attributed to $Li_2SiO_3$, P2, exhibited at a diffraction angle 2θ ranging from 18.6 to 19.2°; and a height of peak attributed to crystalline Si, P3, exhibited at a diffraction angle 2θ ranging from 27.4 to 29.4°, which fulfill Requirement (1): P2/P1<1 and P3/P1<0.5.

2. The Li-containing silicon oxide powder according to claim 1, wherein Li content in the powder is 0.2≤Li/O≤0.6 in terms of element ratio.

3. The Li-containing silicon oxide powder according to claim 1, wherein particles constituting the powder have a particle diameter of 0.5 to 30 μm in terms of median diameter.

4. The Li-containing silicon oxide powder according to claim 1, wherein at least part of particles constituting the powder has a conductive carbon film.

5. The Li-containing silicon oxide powder according to claim 4, wherein an amount of the conductive carbon film ranges from 0.5 to 20 wt % when expressed in terms of a weight proportion of carbon with respect to a mass of the whole of the silicon oxide powder.

* * * * *